(No Model.)
J. TAYLOR.
HOISTING OR LIFTING APPARATUS.
No. 442,466. Patented Dec. 9, 1890.
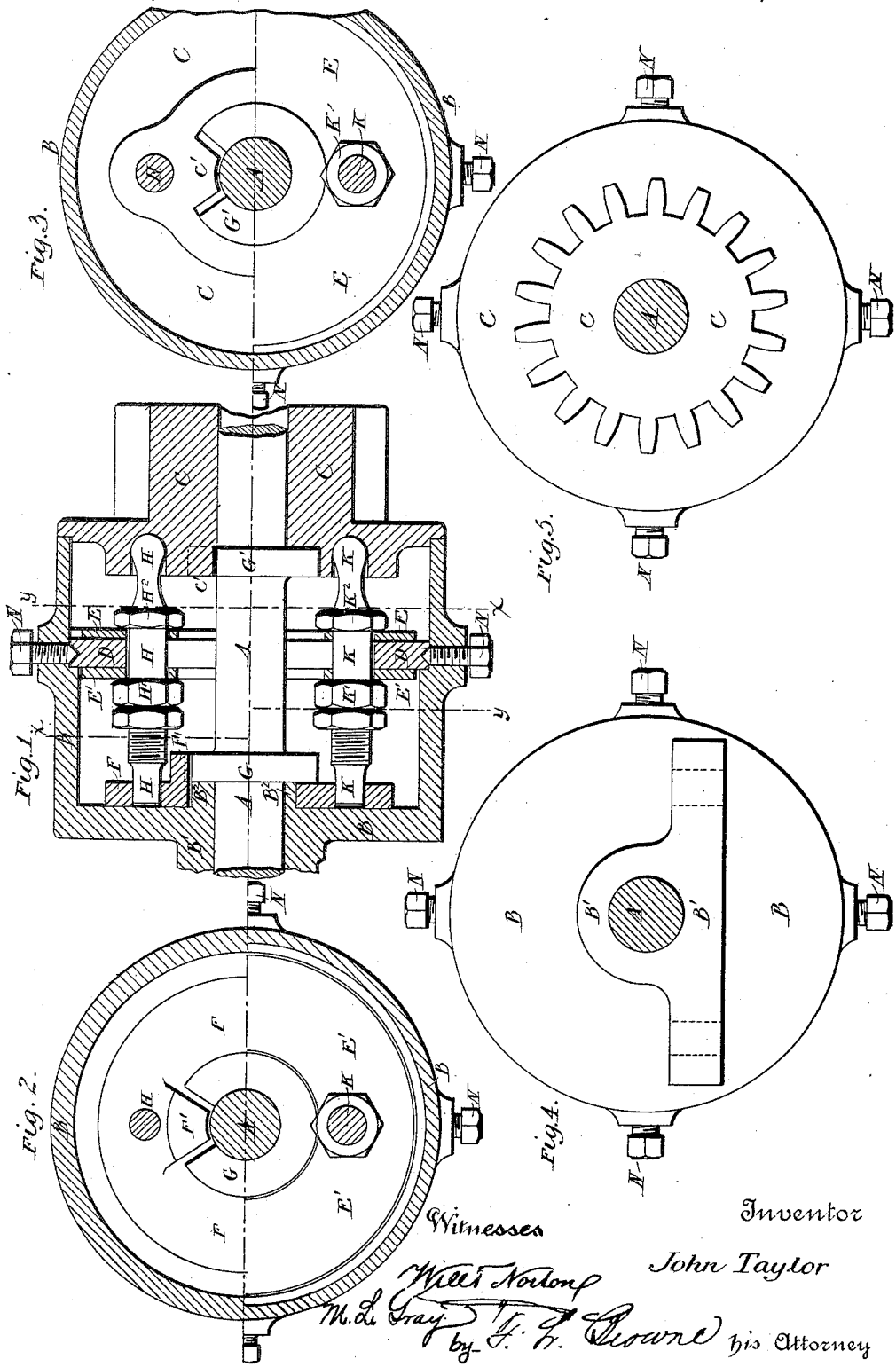
Witnesses
Willi Norton
M. L. Gray
Inventor
John Taylor
by G. H. Browne his Attorney

UNITED STATES PATENT OFFICE.

JOHN TAYLOR, OF NOTTINGHAM, ENGLAND.

HOISTING OR LIFTING APPARATUS.

SPECIFICATION forming part of Letters Patent No. 442,466, dated December 9, 1890.

Application filed June 13, 1889. Serial No. 314,306. (No model.) Patented in England May 11, 1889, No. 7,891.

*To all whom it may concern:*

Be it known that I, JOHN TAYLOR, of the firm of John Taylor & Sons, a subject of the Queen of Great Britain, and a resident of Nottingham, in the county of Nottingham, England, have invented certain new and useful Improvements in Self-Sustaining Apparatus for Hoists or other Lifting Appliances, (for which I have obtained a patent in Great Britain, No. 7,891, dated May 11, 1889,) of which the following is a full, clear, and exact specification.

This invention has for its object improvements in the means of automatically sustaining loads while being raised or lowered by hoists or other lifting appliances, so as to prevent the load from running down when the power is withdrawn therefrom. For this purpose I have a cylindrical or outside casing, in the center of which the driving-shaft of the lifting appliance revolves in suitable bearings. About midway along the length of this casing I fix therein a disk ring concentric with the driving-shaft, and on each side of this ring and sliding freely against it I have two other disk rings, also concentric with the shaft. These two latter rings are carried and driven round in the casing by two or more driving-pins, each made with a collar bearing against the outer side of one disk, and adjusting nuts or collars bearing against the outer side of the other outside disk to keep them in place. One end of each of these driving-pins is carried by a driving-plate turning on a boss in the center of the closed end of the casing, and through which the driving shaft revolves. The other end of each of these driving-pins is carried by a pinion driving the hoist or lifting appliance or by a lift-wheel carrying the load direct on the driving-shaft. Both the driving-plate and the pinion or lifting-wheel are loose on the boss and driving-shaft, respectively, but are capable of being driven round by the shaft by two notched collars on the shaft, the notch in each collar engaging with a stud or claw on the driving-plate and pinion or wheel, respectively.

The action of the apparatus is as follows: When the driving-shaft is being turned round to raise or lower the load, the notched collars thereon drive the driving-plate and pinion round with them simultaneously in such a manner that the driving-pins are carried by them with their center lines exactly parallel with the center line of the driving-shaft, and these pins in consequence cause the two disk rings to revolve freely—one on each side of and parallel with the center fixed disk ring—so as to allow the load to be raised or lowered freely. Immediately the driving-shaft is stopped the driving-plate carrying one end of the driving-pins is stopped with it, and the weight of the load on the pinion or wheel carrying the other end of the pins instantly turns this pinion or wheel slightly round on the shaft and throws the center line of the driving-pins out of parallel with the center line of the shaft. This causes the two driving-disks carried by the pins to firmly close on the center fixed disk, and thereby effectually grip the same, prevents the shaft and pinion or wheel from moving, and holds the load securely suspended.

In order that my invention may be more fully understood and readily carried out and into effect, I will proceed to describe the accompanying sheet of drawings, reference being had to the letters marked thereon.

Figure 1 is a longitudinal sectional elevation of my improved apparatus. Fig. 2 is a transverse sectional elevation of the same, the upper part shown looking toward driving-disk F in Fig. 1, and the lower part looking toward the disk ring E in Fig. 1 and taken on the line $x\ x$ of Fig. 1. Fig. 3 is also a transverse sectional elevation of the same, the upper part shown looking toward the pinion or lifting-wheel C in Fig. 1, and the lower shown looking toward the driving-disk E' in Fig. 1, taken on the line $y\ y$ of Fig. 1. Fig. 4 is a side elevation of the bearing end of the casing B in Fig. 1. Fig. 5 is a side elevation of the driving-pulley C.

Similar letters refer to similar parts throughout the several views.

In the drawings, B is the cylindrical casting or outside casing, in the center of which the driving-shaft A of the lifting appliance revolves in suitable bearings. One bearing B', I prefer to make in one piece with the casing B, and this bearing B', being attached to the frame of the machine, holds the casing B stationary. About midway along the length of this casing I fix therein by means of screws N N or other suitable means a disk ring D, concentric with the driving-shaft A, and on each side of this ring D and sliding freely against it I have two other disk rings E and E', also concentric with the shaft A. These two latter rings are carried and driven round in the casing B by two or more driving-pins H and K, each made with a collar $H^2$ and $K^2$, bearing against the outer side of one disk E, and adjusting nuts or collars H' and K', bearing against the outer side of the other outside disk E' to keep them in place. One end of each of these driving-pins H and K is carried by a driving-plate F, turning on a boss $B^2$ in the center of the closed end of the casing B, and through which the driving-shaft A revolves. The other end of each of these driving-pins H and K is carried by a pinion C, driving the hoist or lifting appliance, or by a lift-wheel carrying the load direct on the driving-shaft A.

Both the driving-plate F and the pinion C or lifting-wheel are loose on the boss $B^2$ and driving-shaft A, respectively, but are capable of being driven round by the shaft A by two notched collars G and G' on the shaft A, the notch in each collar G and G' engaging with a stud or claw F' and C' on the driving-plate F and pinion C or wheel, respectively, these studs F' and C' being somewhat smaller than their respective notches to allow for the necessary play.

The action of the apparatus is as follows: When the driving-shaft A is being turned round to raise or lower the load, the notched collars G and G' thereon drive the driving-plate F and the pinion C round with them simultaneously, in such a manner that the driving-pins H and K are carried by them with their center lines exactly parallel with the center line of the driving-shaft A, and these pins H and K, in consequence, cause the two disk rings E and E' to revolve freely, one on each side of and parallel with the center fixed disk ring D, so as to allow the load to be raised or lowered freely. Immediately the driving-shaft A is stopped the driving-plate F, carrying one end of the driving-pins H and K, is stopped with it, and the weight of the load on the pinion C or wheel, carrying the other end of the pins H and K, instantly turns this pinion C slightly round on the shaft A and slightly in advance of the driving-plate F, which has stopped, and throws the center line of the driving-pins H and K out of parallel with the center line of the shaft A. This causes the two driving-disks E and E', carried by the pins H and K, to firmly close on the center fixed disk D, and thereby effectually grip the same, prevents the shaft A and pinion C from moving, and hold the load securely suspended.

Having now particularly described and ascertained the nature of my said invention and in what manner the same is to be performed and constructed, I declare that what I claim is—

1. In a hoisting-machine, the combination, with the driving-shaft and the cylindrical casing thereon, having the annular disk fixedly secured to the inner peripheral wall of the same, of the movable disks, located one on each side of the fixed disk, and mechanism consisting of the driving-plate F, pinion C, pins H and K, and collars H' $H^2$ K' $K^2$, whereby they are automatically actuated to clamp the fixed disk, for the purpose set forth.

2. The combination, in a hoisting-machine, of the cylindrical casing mounted on the driving-shaft, the fixed disk secured therein, the movable disks located at each side of the fixed disk, the driving-pins passing through the movable disks and provided with binding collars and nuts on opposite sides of the movable disks, and the driving-plate and pinion having bearings for the ends of the pins, substantially as specified.

In testimony that I claim the foregoing I have hereunto set my hand this 24th day of May, 1889.

JOHN TAYLOR.

Witnesses:
H. WALKER HILL,
J. H. TAYLOR.